United States Patent [19]
Booth, III

[11] Patent Number: 5,730,780
[45] Date of Patent: Mar. 24, 1998

[54] METHOD FOR CAPTURING NITROGEN FROM AIR USING GAS SEPARATION MEMBRANE

[75] Inventor: Ronald Earl Booth, III, Post, Tex.

[73] Assignee: Opus Services, Inc., Post, Tex.

[21] Appl. No.: 137,633

[22] Filed: Oct. 15, 1993

[51] Int. Cl.⁶ .................................................. B01D 53/22
[52] U.S. Cl. ........................... 95/51; 95/52; 95/54; 96/8
[58] Field of Search ........................ 95/45, 49–54; 96/7–14

[56] References Cited

U.S. PATENT DOCUMENTS

| | | | |
|---|---|---|---|
| 2,540,151 | 2/1951 | Weller et al. | 95/54 |
| 2,966,235 | 12/1960 | Kammermeyer | 95/51 |
| 3,976,451 | 8/1976 | Blackmer et al. | 96/7 |
| 4,264,338 | 4/1981 | Null | 95/54 X |
| 4,370,150 | 1/1983 | Fenstermaker | 95/50 X |
| 4,386,944 | 6/1983 | Kimura | 95/51 |
| 4,421,529 | 12/1983 | Revak et al. | 95/54 |
| 4,472,175 | 9/1984 | Malon et al. | 95/51 |
| 4,537,606 | 8/1985 | Itoh et al. | 96/7 |
| 4,553,988 | 11/1985 | Shimizu et al. | 96/7 |
| 4,556,180 | 12/1985 | Manatt | 96/8 X |
| 4,597,777 | 7/1986 | Graham | 95/51 |
| 4,602,922 | 7/1986 | Cabasso et al. | 96/13 |
| 4,696,686 | 9/1987 | Usami et al. | 96/13 |
| 4,781,907 | 11/1988 | McNeill | 95/51 X |
| 4,857,082 | 8/1989 | DiMartino, Sr. et al. | 96/7 X |
| 4,883,023 | 11/1989 | Tsang et al. | 96/8 X |
| 4,894,068 | 1/1990 | Rice | 95/51 |
| 4,931,181 | 6/1990 | Blume et al. | 95/51 X |
| 4,950,315 | 8/1990 | Gollan | 96/10 X |
| 5,051,113 | 9/1991 | Nemser | 95/54 |
| 5,051,114 | 9/1991 | Nemser et al. | 95/54 X |
| 5,053,058 | 10/1991 | Mitariten | 95/51 X |
| 5,053,059 | 10/1991 | Nemser | 95/54 |
| 5,061,301 | 10/1991 | Kim et al. | 96/12 |
| 5,147,417 | 9/1992 | Nemser | 95/54 |
| 5,194,074 | 3/1993 | Hauk | 96/10 X |
| 5,284,506 | 2/1994 | Barbe | 95/54 X |
| 5,288,304 | 2/1994 | Koros et al. | 95/45 |
| 5,308,382 | 5/1994 | Prasad | 95/52 X |

*Primary Examiner*—Robert Spitzer
*Attorney, Agent, or Firm*—Richard G. Tonkyn

[57] ABSTRACT

This invention comprises an improved process for generating Nitrogen from air in which a vacuum is placed on the permeate side of a gas separation membrane, usually of the polysulfone type, resulting in highly enhanced flow rates and nitrogen purity sufficient for oil and gas pipeline repair use and for use in grain silos.

4 Claims, 2 Drawing Sheets

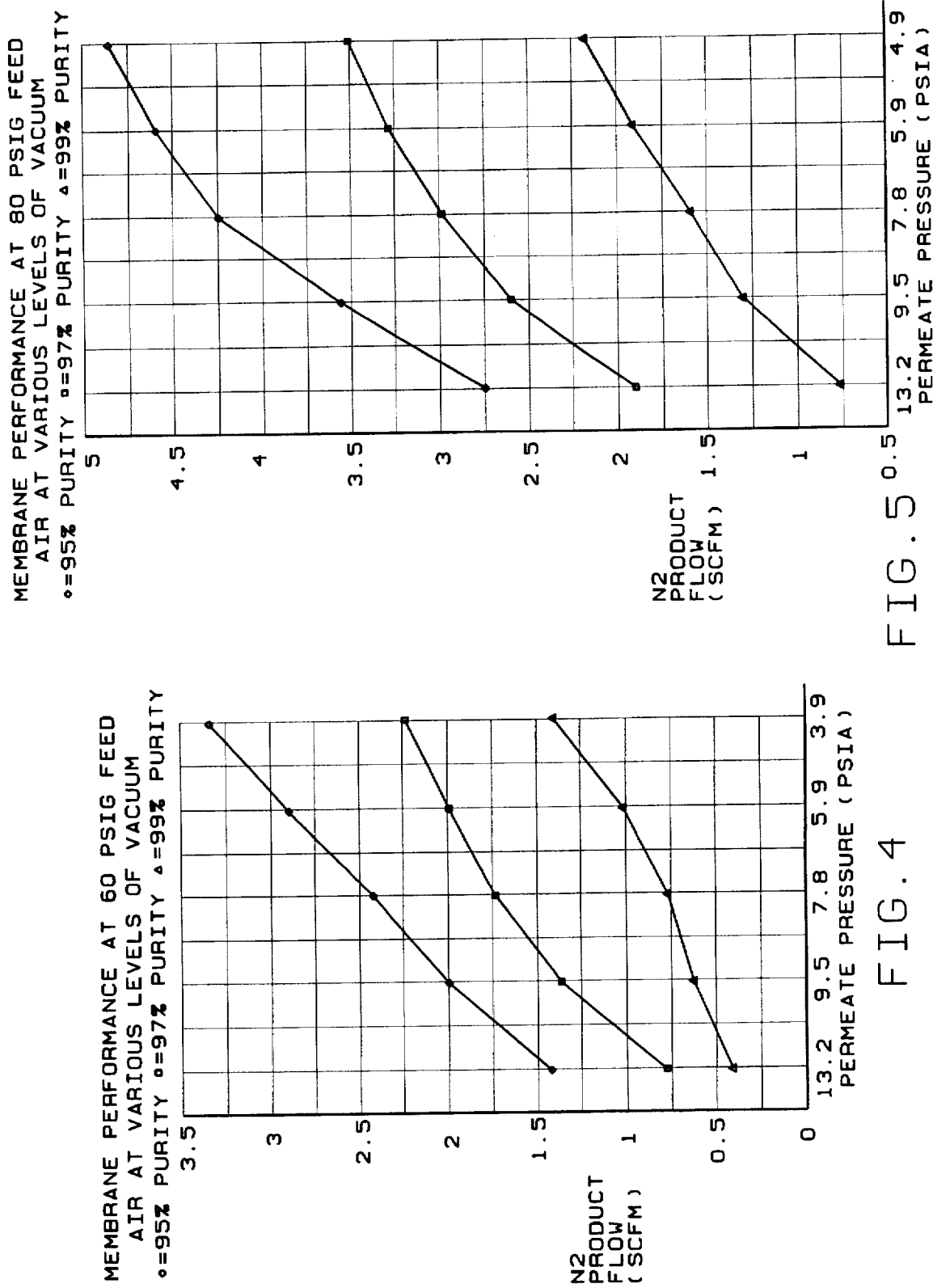

METHOD FOR CAPTURING NITROGEN FROM AIR USING GAS SEPARATION MEMBRANE

BACKGROUND OF THE INVENTION

1. Field of the Invention

The present invention relates to an improved method useful for separating one permanent gas from another or from a mixture of gases. More particularly, the present invention relates to a method for effectively and efficiently separating nitrogen of sufficient purity from air using a membrane separator for use in pipelines and other equipment undergoing repair or for use in grain silos and the like.

2. Prior Art

Membranes have been employed that use the principle of selective permeation to separate a mixture of gases into various components. Each gas has a characteristic permeation rate that is a function of its ability to dissolve into and diffuse through the membrane. For selective separation of one or more of the gases in a mixture to be commercially attractive the membrane not only must withstand the conditions of use but also provide an adequately selective separation of the gases at a sufficiently high flux, i.e. the permeation rate of the permeate per unit surface area, so that the use of the membrane separation procedure is on an economically attractive basis. A given membrane has a particular permeability constant for a given gas. The rate of permeation, i.e. the flux, is related to the permeability constant and influenced by such variables as the membrane thickness, the chemical and physical nature of the membrane, the glass transition of the polymeric membrane material, the partial pressure differential of the permeate gas, the molecular weights of the gases to be separated, and the like.

In the repair of pipelines, tanks, and related equipment in the petroleum and chemical industries it is known to use nitrogen purging and blanketing or inerting in order to effect cutting, welding, brazing and like operations without danger of combustion or explosion. The general practice is to remove as much combustible material as possible from the confined space, blanket or purge with nitrogen, and effect the repair. For a pipeline the practice is to force a purging device, called a pig, through the section of pipeline requiring repair such that the liquids, e.g. crude oil, diesel, gasoline, etc. are forced out of the pipeline section ahead of the pig. The motive force to move the pig through the pipeline section is nitrogen pressure using pressures up to 150 psi to 500 psi or even 1200 psi (pounds per square inch ) and beyond, and after passage of the pig, nitrogen remains in the pipeline section thereby affording a safe atmosphere for the aforementioned repair methods, such as welding, cutting, etc. Commonly the nitrogen is supplied for these operations by cryogenic liquid nitrogen, delivered to the site by liquid nitrogen transport trucks. In order for cryogenic nitrogen to be used it must be not only transported to the site of use but it also must be heated to effect vaporization prior to compression to the required use pressure. The cost of transport and heating of the cryogenic nitrogen are as much as 50% of the repair cost for repair of pipelines in remote locations, e.g. Alaska, Rocky Mountains, offshore platforms, etc . . . A portable membrane separation unit for nitrogen from air with an improved high rate of nitrogen flow would eliminate the need and cost of liquid nitrogen transport and the cost of heating facilities and provide operational flexibility for remote site repairs. Present membrane separators would be improved for practical use in pipeline repair by improved flow rate. Present membrane separators are capable of about 25000 SCF/Hr (standard cubic feet per hour) which is not enough for pipeline repair and work-over where a capacity of about two to four times that rate, or even a higher flow rate, is required.

In another application it is known that nitrogen blanketing of grain silos is an effective means of reducing or eliminating the danger of fire and explosion and, simultaneously, of eliminating rodents, fungi, and other deleterious pests from the grain. It is impractical and costly to use liquid nitrogen for this application because of the need to heat the liquid nitrogen prior to compression and use.

The purity of the nitrogen for the uses of pipeline and equipment repair and for grain silo treatment is such that the oxygen content should be 8% or less and nitrogen content should be in the range of 92% or greater, nitrogen content of 95% to 99% is preferred.

There remains a need for an economically attractive method or means of rapid nitrogen generation using a selective membrane to produce nitrogen in the range of about 92% to about 97% or 99% purity for use in petroleum, petroleum products, chemical or other materials pipeline, tanks, and related equipment while undergoing repair and for use in grain silos for combustion and pest control.

For the most part, with exceptions noted below for the special case of pervaporation, research has focussed on chemical modification of the polymeric membrane to achieve effective separation of gases. For example, multi-component membranes are described in U.S. Pat. No. 4,230,463, polyimide membranes are described in U.S. Pat. No. 4,705,540, U.S. Pat. No. 4,717,393, and U.S. Pat. No. 4,717,394, brominated polycarbonates are described in U.S. Pat. No. 4,840,646 and treatment of membranes with acids and bases are described in U.S. Pat. No. 4,472,175 and U.S. Pat. No. 4,634,055 respectively. Siloxane coating of gas separation membranes is described in U.S. Pat. No. 4,484,935. The coating may also be of rubber. In each case the objective is to provide improved separation. The activity in this field suggests that improvement in gas selectivity and permeation rate continue to be objectives of continued research.

The use of physical means also has been used to improve separation in the special case of pervaporation in which membranes are used to separate organic, condensable liquids. In U.S. Pat. No. 5,032,148, U.S. Pat. No. 4,218,312, U.S. Pat. No. 4,311,594 and U.S. Pat. No. 4,962,270 and references cited therein a vacuum is applied to the permeate side of a membrane separator in order to improve separation of condensable vapors of organic liquids. The need to operate gas separation membranes at high pressure differentials is noted in U.S. Pat. No. 4,472,175, U.S. Pat. No. 4,486,202 and U.S. Pat. No. 4,654,055. The utility of improved performance by means of permeate side vacuum in the case of permanent gases is not disclosed, however.

The theory of membrane gas separation as presently understood is given in Hwang and Kammermeyer, Techniques of Chemistry, Vol. VII, Membranes in Separation, John Wiley & Sons, 1975 (herein incorporated by reference), pages 9, 56, 57, and 72. The method of determination of the permeability constant is given on pages 297–300. In Hwang, the flow rate, F, is given by $F=QS(P1-P2)/l$ where Q is the permeability constant, S is the area, l is the thickness, and P1 and P2 are the pressures on the feed and permeate sides of the membrane, respectively. Thus for a membrane of fixed area and thickness the flow rate is a simple function of the pressure differential. Also, according to Friedlander and Rickles, Anal. Chem. 37, 27A (1965) cited in Hwang on Page 56, the permeability constant, Q, is independent of pressure for the permanent gases such as nitrogen and oxygen. For example, if the feed pressure is 150 psig (pounds per square inch gauge) and the permeate pressure is 15 psig then lowering the permeate pressure to about zero psig is a 10% pressure differential change and would be expected to change the flow rate, F, by 10%. Feed pressures of 200 psig, or even higher, may be encountered, and a vacuum on the permeate side up to 3.4 psia (pounds per square inch absolute) would result in a prediction of flow rate improvement of about 10%, based on the theory given by Hwang.

SUMMARY OF THE INVENTION

In accordance with the present invention an economical and practical process is provided for producing from air an inert gas having an oxygen content of about 1% to about 8% at a flow rate such that a practical means nitrogen blanketing is accomplished. This is done by providing a vacuum on the permeate side of a gas separation membrane. The flow rate attained by this method is at least twofold, and may be fourfold or even higher, than the flow rate without applied vacuum on the permeate side of the membrane. The economic advantage of the flow rate improvement attained is obvious since for a given flow rate and desired purity only half or less of membrane surface area is required with the assistance of vacuum on the permeate side. The membrane unit is composed of a plurality of elongated, parallel, hollow fibers juxtaposed within an elongated shell or container.

The process of the present invention provides for capturing nitrogen of about 92% to about 97% or 99% purity at a substantially enhanced flow rate, substantially and surprisingly above the flow rate improvement predicted by theory for a permanent gas. First, air is compressed from a source. The feed air is passed through an in line rotameter and into and through the bundle of hollow fiber membranes. A first pressure gauge and first control valve are placed on the non-permeate stream and a second pressure gauge and second control valve are placed on the permeate stream. A vacuum gauge on the permeate stream is used to verify vacuum levels being applied by a vacuum pump. The permeate gases exiting from the membrane are vented for disposal or may be collected for other uses. In particular, the permeate gases, rich in oxygen, may be used to improve the combustion efficiency of the diesel or gasoline engines used to provide power to the compressor and the vacuum pump. By this means a hotter, cleaner burn of fuel is obtained and a portion of the vacuum can be obtained from the engine intake. The result of using the permeate gases in this way is a further improvement in economy of operation. The entire apparatus thus constitutes a system wherein nitrogen suitable for pipeline and grain silo uses is produced while the permeate gases, mostly oxygen, are simutaneously utilised in the energy generation used to oprate the system. The non-permeate gas is composed substantial entirely of nitrogen. The non-permeate gas is removed from the exit end of the membrane and is collected and confined under pressure for use. Preferably, the hollow fiber membranes are constructed of polysulfone polymer which has been coated with a suitable coating such as silicone. In practice, coated hollow fiber membranes are longitudinally disposed within the container and sealed so that the permeate gases such as oxygen, carbon dioxide, water vapor and the like can be collected and disposed of and the non-permeate gases such as nitrogen can be collected for use in inerting and other uses.

DESCRIPTION OF THE DRAWINGS

FIGS. 2, 3, 4, and 5 are graphs illustrating the improved flow rate as a function of vacuum applied to the permeate at different feed pressures.

DETAILED DESCRIPTION OF THE INVENTION

Figure 1:
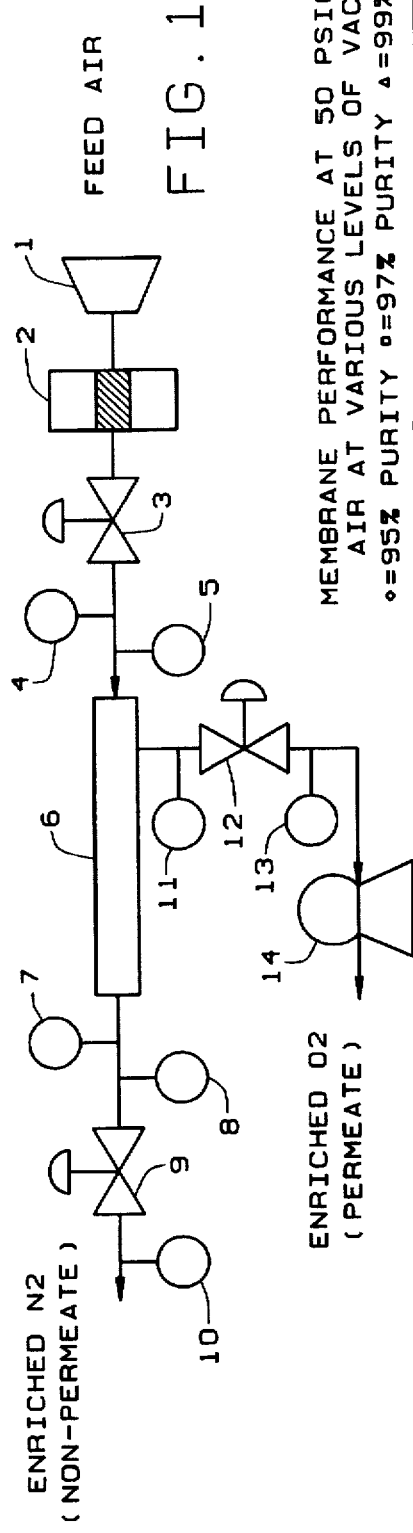
FIG. 1 is a schematic drawing showing apparatus suitable for carrying out the present invention.

With reference in detail to the drawings, as shown in FIG. 1, numeral 1 denotes a feed air compressor supplying up to 120 psig of feed air. The feed air is then passed through the filter (2) for removing water vapor and particulates in the air line. The pressure control valve (3) and gauge (4) are on the feed stream. The air the is passed through a rotameter (5) and into the hollow fiber membrane (6). Another pressure gauge (7) on the non-permeate stream, is used to check the pressure across the membrane itself. Once the system is filled with air, the pressure control valves on the permeate (12) and non-permeate (9) are opened. A rotameter (8) is installed on the non-permeate stream for determination of nitrogen flow. In both the permeate and non-permeate streams the oxygen levels are monitored by oxygen analyzers (10, 13). The vacuum gauge (11) on the permeate stream is used to verify vacuum levels being applied by the vacuum pump (14).

Figure 2:
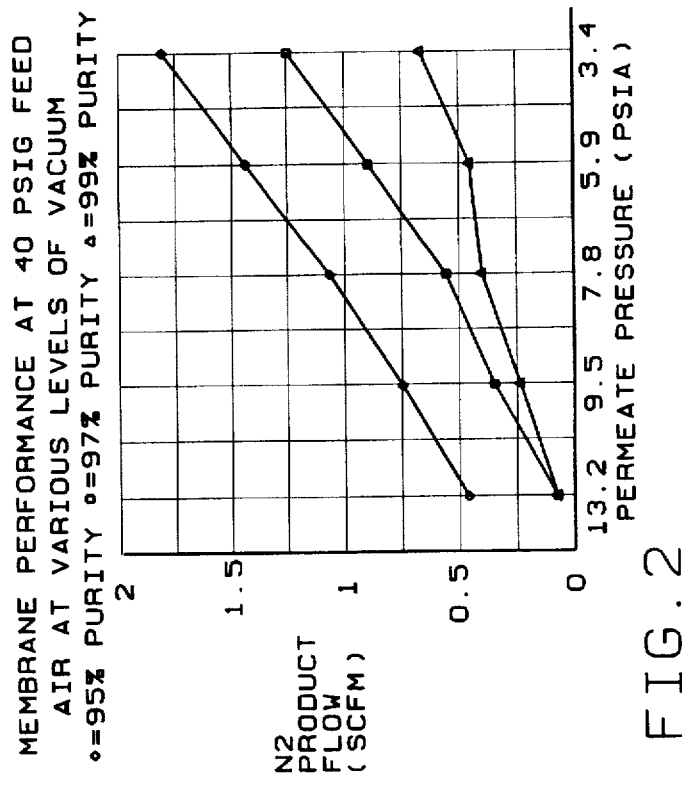

Using the apparatus described in FIG. 1 reference readings were taken and vacuum levels at approximately 3, 5, 7, and 9 psia were taken with three repetitions at each feed pressure. Readings were obtained for feed pressures of 40, 50, 60, and 80 psig while producing 95%, 97% and 99% pure nitrogen. The data are illustrated in FIGS. 2, 3, 4, and 5. As a result of reducing the pressure on the permeate stream the volume of nitrogen produced increased dramatically. At 40 psig feed pressure the volume of 95% pure nitrogen climbed from 0.45 standard cubic feet per minute (SCFM) to 1.81 SCFM, an increase of 302% while at 97% and 99% purity increases of 1966% and 1033% were obtained. In general over a three to ten fold increase in productivity was observed for product purity of 99% and a two to four fold increase in productivity was obtained for product nitrogen of 95% purity. The practical effect of this invention is that a commercial unit capable of 25000 SCF/Hr of 95% pure nitrogen can be improved to a flow rate of about 100,000 SCF/Hr., thereby making such a unit practical for pipeline repair use at significantly lower cost than cryogenic nitrogen and even lower cost than current membrane-generated nitrogen. The data used for FIG. 2 are shown below in tabular form, Table 1.

TABLE I

| Vacuum | Non-Permeate Flow Rate (Nitrogen) at various purities (SCFM) | | |
|---|---|---|---|
| psia | 95% | 97% | 99% |
| 13.2 | 0.45 | 0.06 | 0.06 |
| 9.5 | 0.75 | 0.34 | 0.23 |
| 7.8 | 1.13 | 0.57 | 0.34 |
| 5.9 | 1.41 | 0.85 | 0.45 |
| 3.4 | 1.81 | 1.24 | 0.68 |

In Table 1 psia = pounds per square inch absolute. SCFM = standard cubic feet per minute.

Figure 3:
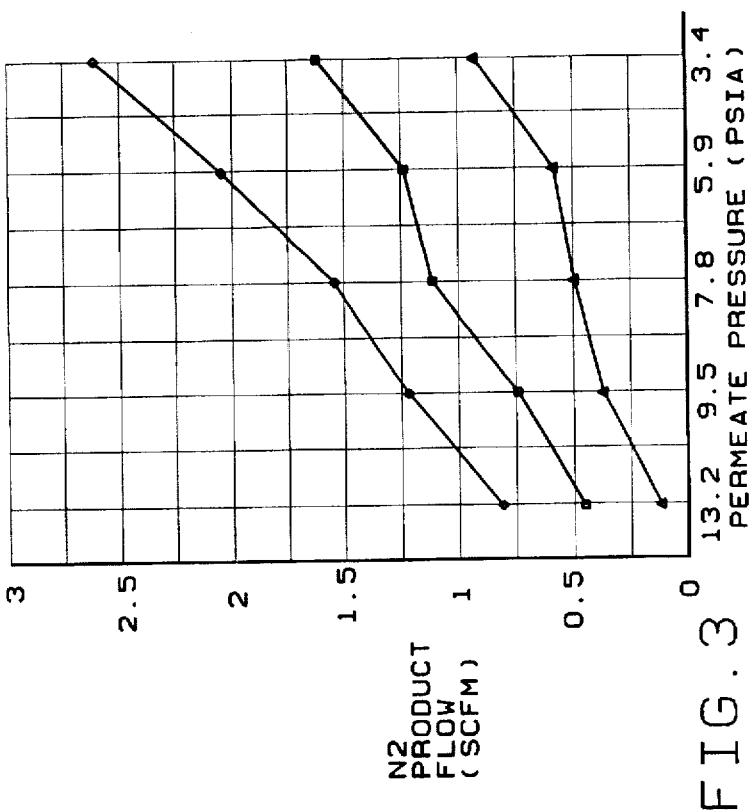

From FIG. 3, at 50 psig feed pressure the produced volume increase for nitrogen of 95% purity increased from about 0.8 SCFM to 2.7 SCFM as permeate pressure declined from 13.2 psia to 3.41 psia, an increase of 237%.

From FIG. 4 for 60 psig feed pressure the nitrogen product flow rate for 95% purity nitrogen increased from 1.4 SCFM to 3.3 SCFM as permeate pressure declined from 13.2 psia to 3.89 psia, an increase of 136%.

From FIG. 5. for 80 psig feed pressure the nitrogen product flow increased from 2.7 SCFM to 4.6 SCFM for 95% purity nitrogen as permeate pressure declined from 13.2 psia to 4.88 psia, an increase in flow rate of 70%.

As can be seen from FIGS. 2, 3, 4, and 5 the flow rate increases at each feed pressure with increasing permeate vacuum manyfold times faster than predicted by theory. This invention allows for the use of a membrane separator with very high nitrogen flow rate in practical pipeline and tank repair and in grain silo nitrogen treatment without the need for heating facilities required by cryogenic nitrogen. The nitrogen purity attained by the instant method is sufficient for its intended purposes.

The data shown in FIGS. 2, 3, 4, and 5 are examples of the improvement provided by the instant invention and not limiting in the scope of the invention.

What is claimed is:

1. A process for producing nitrogen gas from air at an enhanced flow rate wherein the oxygen content of the produced gas is 8% or less using a membrane separator, the process comprising: (a) moving compressed air at a pressure from about 40 psig to about 120 psig into a membrane separator containing a plurality of hollow fiber membranes confined in a container, the separator being adapted to permit selectively the passage therethrough of oxygen, carbon dioxide and water vapor while restraining the passage of nitrogen; (b) applying a vacuum to the permeate side of the separator of from about 3.4 psia to about 13.2 psia to provide an enhanced flow rate of nitrogen wherein the flow rate of nitrogen is at least twofold higher to fourfold higher than is observed without applied vacuum; (c) collecting under pressure the resultant non-permeate gas from the membrane separator.

2. A process of claim 1 wherein the hollow fiber membrane separator is constructed of polysulfone polymer.

3. A process of claim 2 wherein the polysulfone polymer is coated with a silicone.

4. A process of claim 1 wherein the nitrogen content of the produced gas is 92% to 99%.

* * * * *